United States Patent
Mae

(10) Patent No.: US 8,039,541 B2
(45) Date of Patent: Oct. 18, 2011

(54) (METH)ACRYLIC POLYMER PARTICLE, METHOD FOR PRODUCING THE SAME, PLASTISOL COMPOSITION MADE FROM THE POLYMER PARTICLE, AND ARTICLE MADE FROM THE PLASTISOL COMPOSITION

(75) Inventor: Satoshi Mae, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 12/524,255

(22) PCT Filed: Jan. 23, 2008

(86) PCT No.: PCT/JP2008/050853
§ 371 (c)(1),
(2), (4) Date: Jul. 23, 2009

(87) PCT Pub. No.: WO2008/090906
PCT Pub. Date: Jul. 31, 2008

(65) Prior Publication Data
US 2010/0069566 A1    Mar. 18, 2010

(30) Foreign Application Priority Data

Jan. 23, 2007    (JP) ................................. 2007-012646

(51) Int. Cl.
*C08L 33/00*    (2006.01)
*C08L 33/06*    (2006.01)
(52) U.S. Cl. ...................................... 524/523; 524/560
(58) Field of Classification Search ................... 524/523
See application file for complete search history.

(56) References Cited

U.S. PATENT DOCUMENTS

| | | | |
|---|---|---|---|
| 4,199,486 A | 4/1980 | Boessler et al. | |
| 5,474,783 A | 12/1995 | Miranda et al. | |
| 5,840,786 A * | 11/1998 | Beck et al. | 523/201 |
| 6,433,048 B2 * | 8/2002 | Kasai | 524/244 |
| 7,189,773 B2 * | 3/2007 | Saiki et al. | 524/378 |
| 2004/0086569 A1 | 5/2004 | Sparer et al. | |
| 2004/0147668 A1 | 7/2004 | Miyake et al. | |
| 2008/0293854 A1 | 11/2008 | Schattka et al. | |
| 2009/0137740 A1 | 5/2009 | Mae et al. | |

FOREIGN PATENT DOCUMENTS

| | | |
|---|---|---|
| DE | 27 22 752 A1 | 11/1978 |
| DE | 10 2004 030 404 A1 | 1/2006 |
| EP | 0 557 944 | 9/1993 |
| EP | 1 217 037 A1 | 6/2002 |
| EP | 1 382 634 A3 | 1/2004 |
| JP | 54 117553 | 9/1979 |
| JP | 7 102147 | 4/1995 |
| JP | 7 233299 | 9/1995 |
| JP | 10 77379 | 3/1998 |
| JP | 2002 212303 | 7/2002 |
| JP | 2004 331756 | 11/2004 |
| JP | 2004 352846 | 12/2004 |
| JP | 2005 146139 | 6/2005 |
| WO | 00 01748 | 1/2000 |
| WO | 03 004568 | 1/2003 |
| WO | WO 2006/010465 A1 | 2/2006 |

OTHER PUBLICATIONS

Mark, Physical Propertis of Polymers Handbook, Chapter 16, Springer 2007.*
Fedors, Robert F., "A Method for Estimating Both the Solubility Parameters and Molar Volumes of Liquids", Polymer Engineering and Science, Brookfield Center, vol. 14, No. 2, Feb. 1, 1974, pp. 147-154.
Wohlfarth, Christian, "Solubility Parameters of Selected Polymers", CRC Handbook of Chemistry and Physics, $91^{st}$ Edition, 2010, pp. 13-70-13-71, XP-002608010.
Sigma Aldrich, "Reference: polymer properties" [online], pp. 46-49, XP-002608011, Polymer products from Aldrich, retrieved Nov. 3, 2010.
Supplementary European Search Report issued Dec. 2, 2010, in EP 08 70 3697, filed Jan. 23, 2008.
Yecang, et al., "Preparation and Characterization of Emulsifier-free Cationic MMA/HEMA Copolymer Latex Particle", Chinese Journal of Chemical Physics, vol. 16, No. 4, Aug. 2003.
Office Action dated Apr. 1, 2011, in Chinese Patent Application No. 200880002865, filed Jan. 23, 2008.

* cited by examiner

*Primary Examiner* — Ling Choi
*Assistant Examiner* — Hui Chin
(74) *Attorney, Agent, or Firm* — Oblon, Spivak, McClelland, Maier & Neustadt, L.L.P.

(57) ABSTRACT

Disclosed are an industrially useful (meth)acrylic polymer particle for use in a plastisol which is excellent in storage stability, particularly under circumstance at 40° C. or above, so that it can suppress gelation and maintain a sol state during storage and which can give a shaped article excellent in flexibility and chipping resistance; a method for producing the (meth)acrylic polymer particle; and a plastisol composition made from the (meth)acrylic polymer particle. Specifically disclosed is a method for producing a (meth)acrylic polymer particle, which comprises polymerizing a monomer or monomer mixture (B) to form a polymer (b) in the presence of a polymer (a) obtained by polymerization of a monomer or monomer mixture (A), wherein a glass transition temperature (Tg) of the polymer (a) as calculated from the FOX equation is 90° C. or above, a solubility parameter of the polymer (a) is 19.90 $(J/cm^3)^{1/2}$ or below, and a solubility parameter of the polymer (b) is 20.22 $(J/cm^3)^{1/2}$ or above.

19 Claims, No Drawings

(METH)ACRYLIC POLYMER PARTICLE, METHOD FOR PRODUCING THE SAME, PLASTISOL COMPOSITION MADE FROM THE POLYMER PARTICLE, AND ARTICLE MADE FROM THE PLASTISOL COMPOSITION

TECHNICAL FIELD

The present invention relates to a (meth)acrylic polymer particle suitable for a plastisol composition which has excellent storage stability and can give an article having good chipping resistance, a method for producing the same, a plastisol composition made from the (meth)acrylic polymer particle, and an article obtained from the plastisol composition.

BACKGROUND ART

A plastisol in which polymer fine particles are dispersed in a plasticizer used as a medium has been used in various industrial fields such as automotive undercoats, auto body sealers, wall papers, carpet backings, floor materials, paints, and toys.

Conventionally, plastisols have mostly been vinyl chloride sols using vinyl chloride polymer particles. In recent years, a shift to acrylic sols in which (meth)acrylic polymer particles are used has been investigated from the consideration of global environment and the like. The acrylic sols have an advantage such that they do not generate toxic dioxins or halogenated hydrogen gases that are a cause of acid rain when products produced from the acrylic sols are incinerated because the acrylic sols do not contain halogen elements.

The shift from vinyl chloride sols to the acrylic sols is being positively advanced, in particular, in the uses of automotive undercoats and auto body sealers. This is because, in addition to the above environmental problem, there is a problem such that hydrogen chloride generated from vinyl chloride sols at a melting step of crushed steel in recycling automotives causes damage of equipment.

It is preferable that plastisols can stably maintain a sol state during storage, can have excellent gelation properties that causes fast gelation when the plastisols are heated, and can give coating films or shaped articles that have toughness and flexibility. As such acrylic sols, those containing a plasticizer and (meth)acrylic polymer particles, which are constructed from a core layer giving flexibility of coating films and a shell layer suppressing contact of a polymer in the core layer with the plasticizer and thus giving storage stability, and further compounded with a blocked isocyanate-based adhesive which gives coating films adhesive properties or strength, have been reported in Patent Document 1. Such acrylic sols can satisfy practically desired physical properties, however, they are liable to cause stringiness or sagging when coated if a large amount of the adhesive, which is a highly viscous liquid material, is compounded, and hence further improvement has been desired.

Further, there is a tendency that material costs of the acrylic sols become higher as compared with those of vinyl chloride sols. As main causes of this, the facts that raw material cost of (meth)acrylic polymer particles is high and that adhesives, curing agents, and anti-sagging agents tend to be compounded in large quantities can be listed.

Although various proposals have been offered to solve these problems, the most effective measure among them is the reduction of the content of the adhesives. However, when the content of the adhesives in the acrylic sols is reduced, not only adhesive properties but also chipping resistance or storage stability of shaped articles such as coating films shaped from the acrylic sols are liable to be lowered. Therefore, it has been desired to develop (meth)acrylic polymer particles by which a shaped article such as coating films having excellent chipping resistance and tensile strength can be obtained and whose storage stability is improved. However, (meth)acrylic polymer particles satisfying these demands have not been developed yet.

It has been reported in Patent Documents 2 and 3 that functional group-containing (meth)acrylic copolymer particles having a large particle diameter ranging from about several micrometers to 100 μm and a high glass transition temperature (Tg) are used as a resin component in order to improve storage stability of the acrylic sols. However, the storage stability of the acrylic sol composition described in Patent Document 2 is not sufficient in a practical industrial usage environment at 40° C. or above, though it is guaranteed at room temperature. In addition, as for the acrylic sol composition described in Patent Document 3, flexibility of the coating films obtained therefrom is not sufficient and chipping resistance of the coating films is liable to become insufficient. In addition, these acrylic sol compositions tend to have lowered anti-sagging property because particles having a large particle diameter are used and hence interactions among the particles are weak and hence viscosity is low.

Further, the acrylic sol composition containing a specific plasticizer and core-shell type polymer particles having a specific solubility parameter, which is referred to as Sp value, is proposed in Patent Document 4, however, when a general-purpose plasticizer is used, bleeding of the plasticizer or deficiency in storage stability occurs and chipping resistance of coating films to be obtained tends to be lowered. In addition, it is desired that the acrylic sol composition be improved to have storage stability in a practical industrial usage environment at 40° C. or above.

Further, the acrylic sol composition in which a monovinyl aromatic copolymer covered with a methacrylate polymer whose molecular weight is adjusted by a chain transfer agent, and further ionically crosslinked is used, is proposed in Patent Document 5. However, coating films shaped from the acrylic sol composition have insufficient chipping resistance.

Patent Document 1: International Publication No. WO 2000/001,748
Patent Document 2: Japanese Patent Application Laid-Open No. Sho 54-117,553
Patent Document 3: Japanese Patent Application Laid-Open No. Hei 7-102,147
Patent Document 4: International Publication No. WO 2003/004,568
Patent Document 4: Japanese Patent Application Laid-Open No. 2004-352,846

DISCLOSURE OF INVENTION

Problem to be Solved by the Invention

Subjects of the present invention are to provide an industrially useful (meth)acrylic polymer particle for use in a plastisol which is excellent in storage stability, particularly under environment at 40° C. or above, so that it can suppress gelation and thereby maintain a sol state during storage and which can give a shaped article excellent in flexibility and chipping resistance; a method for producing the (meth)acrylic polymer particle; and a plastisol composition made from the (meth) acrylic polymer particle. Further subjects of the present invention are to provide a plastisol composition which is excellent in anti-sagging property when applied and hence excellent in coatability and easily processable; and an article obtained from the plastisol composition.

Means for Solving the Problem

The present invention relates to a method for producing a (meth)acrylic polymer particle, comprising polymerizing a monomer or monomer mixture (B) to form a polymer (b) in the presence of a polymer (a) obtained by polymerization of a monomer or monomer mixture (A), wherein a glass transition temperature (Tg) of the polymer (a) as calculated from the FOX equation is 90° C. or above, a solubility parameter of the polymer (a) is 19.90 $(J/cm^3)^{1/2}$ or below, and a solubility parameter of the polymer (b) is 20.22 $(J/cm^3)^{1/2}$ or above.

Further, the present invention relates to a (meth)acrylic polymer particle obtained by the aforementioned method.

Further, the present invention relates to a plastisol composition comprising the aforementioned (meth)acrylic polymer particle and a plasticizer, wherein the plasticizer contains 60% by mass or more of a plasticizer having a solubility parameter in a range of from 18.40 $(J/cm^3)^{1/2}$ or above to lower than 18.71 $(J/cm^3)^{1/2}$.

Further, the present invention relates to a plastisol composition comprising the aforementioned (meth)acrylic polymer particle and a plasticizer, wherein the plasticizer contains 1% by mass or more and less than 40% by mass of a plasticizer having a solubility parameter in a range of from 18.71 $(J/cm^3)^{1/2}$ or above to lower than 20.45 $(J/cm^3)^{1/2}$.

Further, the present invention relates to an article, an undercoating material for automobile, or a body sealer obtained from the aforementioned plastisol composition.

Effect Of The Invention

The (meth)acrylic polymer particle and the plastisol composition using the (meth)acrylic polymer particle of the present invention are excellent in storage stability, particularly under environment at 40° C. or above, so that they can suppress gelation and thereby maintain a sol state during storage and can give a shaped article having flexibility and excellent in chipping resistance, and thus they are industrially extremely useful. In addition, the plastisol composition of the present invention is excellent in anti-sagging property when applied and hence excellent in coatability and easily processable, and can easily produce the article of the present invention, in particular, the undercoating material for automobile, or the body sealer. The method for producing a (meth)acrylic polymer particle of the present invention can easily produce the (meth)acrylic polymer particle.

BEST MODE FOR CARRYING OUT THE INVENTION

The method for producing a (meth)acrylic polymer particle of the present invention is characterized by polymerizing a monomer or monomer mixture (B) to form a polymer (b) in the presence of a polymer (a) obtained by polymerization of a monomer or monomer mixture (A), wherein a glass transition temperature (Tg) of the polymer (a) as calculated from the FOX equation is 90° C. or above, a solubility parameter of the polymer (a) is 19.90 $(J/cm^3)^{1/2}$ or below, and a solubility parameter of the polymer (b) is 20.22 $(J/cm^3)^{1/2}$ or above.

In the method for producing the (meth)acrylic polymer particle of the present invention, the polymer (b) is formed in the presence of the polymer (a). The (meth)acrylic polymer particle contains the polymer (a), which has a high compatibility with a plasticizer and a high Tg, and the polymer (b), which has a low absorptivity of the plasticizer, so that absorption speed of the plasticizer of the (meth)acrylic polymer particle is lowered, and hence a plastisol composition excellent in storage stability can be obtained.

The solubility parameter of the aforementioned polymer (a) is 19.90 $(J/cm^3)^{1/2}$ or below. When the polymer (a) having a solubility parameter (δ) of 19.90 $(J/cm^3)^{1/2}$ or below is used for formation of the acrylic polymer particle, films or shaped articles to be formed from the plastisol composition thus obtained can have a low Tg, flexibility, and improved chipping resistance even if the acrylic polymer particle has a high Tg. The solubility parameter of the polymer (a) is preferably 18.30 $(J/cm^3)^{1/2}$ or above. When the solubility parameter of the polymer (a) is 18.30 $(J/cm^3)^{1/2}$ or above, films excellent in strength tend to be obtained. A monomer or monomer mixture (A) can be selected so as to obtain the polymer (a) having such a solubility parameter.

A solubility parameter can be calculated from equation (1) by insertion of a Sp value of each monomer unit, namely Sp (Ui), in monomer units constituting a polymer. The Sp (Ui) can be obtained by the Fedors method described in Polymer Engineering and Science, Vol. 14, 147, 1974. Sp values, namely Sp (Ui), of representative monomer units are shown in Table 1.

Equation (1)

$$Sp \text{ value} = \sum_{i=1}^{n} (Mi \times Sp(Ui)) \quad (1)$$

In the equation (1), Mi represents a molar ratio of i component in the monomer units, and Σ Mi equals 1.

TABLE 1

| | Sp(Ui) | | Tgi |
|---|---|---|---|
| | $(J/cm^3)^{1/2}$ | $(cal/cm^3)^{1/2}$ | (° C.) |
| MMA | 20.32 | 9.94 | 105 |
| EMA | 19.89 | 9.73 | 65 |
| n-BMA | 19.33 | 9.45 | 20 |
| i-BMA | 18.96 | 9.27 | 60 |
| t-BMA | 18.29 | 8.95 | 107 |
| IBXMA | 19.61 | 9.59 | 110 |
| CHMA | 19.89 | 9.73 | 83 |
| MAA | 25.65 | 12.55 | 228 |
| nBA | 19.99 | 9.78 | −54 |
| St | 20.09 | 9.83 | 100 |
| 2HEMA | 27.56 | 13.48 | 38 |
| 2EHMA | 18.50 | 9.05 | −25 |
| iPMA | 19.15 | 9.37 | 81 |
| NVImd | 25.16 | 12.31 | — |

In addition, the Tg of the aforementioned polymer (a) is 90° C. or above. When the Tg of the polymer (a) is 90° C. or above, storage stability of the plastisol composition thus obtained is improved not only at room temperature but also at such a relatively high storage temperature as 40° C. or above. Although the reason why is not clear, it is presumed that, when the Tg of the polymer (a) be lower than 90° C., molecular mobility of the polymer increase with a rise of the temperature during storage, which advance mixing of the polymer (a) and the polymer (b) with the passage of time, and hence the polymer (a) come to contact with a plasticizer, while, when the Tg of the polymer (a) be 90° C. or above, mixing of the polymer (a) and the polymer (b) do not advance even if the temperature of storage be at 40° C. or above and hence contact of the polymer (a) with the plasticizer be suppressed. Further, the Tg of the polymer (a) is preferably lower than 250° C. When the Tg of the polymer (a) is lower than 250° C., film formability of the plastisol composition when heated becomes good and strength of the film thus obtained tends to be raised. A monomer or monomer mixture (A) can be selected so as to obtain the polymer (a) having such a Tg.

The Tg of the copolymer (a) is calculated from the FOX equation (equation (2)) as mentioned above. Specifically, when the polymer is a homopolymer, standard analytical values shown in "Polymer Data Handbook" edited by the Society of Polymer Science, Japan can be adopted, and when the polymer is a copolymer polymerized from n kinds of monomers, the value calculated from a Tg of a homopolymer of each monomer can be used. The Tg literature values of representative homopolymers are shown in Table 1.

Equation (2)

$$\frac{1}{Tg + 273} = \sum_{i=1}^{n} \frac{Wi}{Tgi + 273} \qquad (2)$$

In the equation (2), Tg represents a glass transition temperature in ° C. of the copolymer, Tgi represents a glass transition temperature in ° C. of a homopolymer of i component, Wi represents a mass ratio of i component, and Σ Wi equals 1.

The solubility parameter of the aforementioned polymer (b) is 20.22 $(J/cm^3)^{1/2}$ or above. When the solubility parameter of the polymer (b) is 20.22 $(J/cm^3)^{1/2}$ or above, absorptivity of the plasticizer of the (meth)acrylic polymer particle is lowered and hence storage stability of the plastisol composition thus obtained becomes good. When the solubility parameter of the polymer (b) is 22.00 $(J/cm^3)^{1/2}$ or below, film formability of the plastisol composition when heated becomes good. In addition, the glass transition temperature of the polymer (b) is preferably 80° C. or above. A monomer or monomer mixture (B) can be selected so as to obtain the polymer (b) having such a solubility parameter or a glass transition temperature.

Both the aforementioned polymer (a) and polymer (b) contain units of acrylate, methacrylate, which are collectively expressed as (meth)acrylate, or a derivative of (meth)acrylate, or contain two or more kinds of these units. As the units of (meth)acrylate, units of acrylonitrile or (meth)acrylate having calboxyl group, sulfonic acid group, phosphate group, hydroxyl group, carbonyl group, or amino group can be mentioned.

As the monomer units contained in the aforementioned polymer (a) or polymer (b), specifically, for example, monomer units of acrylonitrile; (meth)acrylates of linear alkyl alcohols such as methyl (meth)acrylate, ethyl (meth)acrylate, n-butyl (meth)acrylate, i-butyl (meth)acrylate, t-butyl (meth)acrylate, hexyl (meth)acrylate, 2-ethylhexyl (meth)acrylate, and octyl (meth)acrylate; (meth)acrylates of cyclic alkyl alcohols such as cyclohexyl (meth)acrylate; carboxyl group-containing monomers such as methacrylic acid, acrylic acid, 2-succinoloyloxyethyl methacrylate, 2-malenoloyloxyethyl methacrylate, 2-phthaloyloxyethyl methacrylate, and 2-hexahydrophthaloyloxyethyl methacrylate; (meth)acrylates containing a sulfonic acid group such as the allyl sulfonic acid, (meth)acrylates containing a phosphate group such as 2-(meth)acryloyloxyethyl acid phosphate; hydroxyl group-containing (meth)acrylates such as 2-hydroxyethyl (meth)acrylate and 2-hydroxypropyl (meth)acrylate; carbonyl group-containing (meth)acrylates such as acetoacetoxyethyl (meth)acrylate; amino group-containing (meth)acrylates such as N- dimethylaminoethyl (meth)acrylate and N-diethylaminoethyl (meth)acrylate; acrylamide compounds such as acryl amide diacetone acrylamide, N-methylolacrylamide, N-methoxy methylacrylamide, N-ethoxy methylacrylamide, and N-butoxy methylacrylamide; and multifunctional (meth)acrylates such as (poly)ethylene glycol di(meth)acrylate, propylene glycol di(meth)acrylate, 1,6-hexanediol di(meth)acrylate, and trimethylolpropane tri (meth)acrylate can be mentioned. These monomer units can be used alone or in a combination of two or more kinds.

The aforementioned polymer (a) specifically contains methyl methacrylate units and t-butyl methacrylate units, and may contain units of one kind or two or more kinds of another monomer copolymerizable with monomers constituting these monomer units, and preferably contains 10% by mass or more of t-butyl methacrylate units. As for the polymer having such monomer units, Tg or solubility parameter is easily adjustable to fall within the above-mentioned range, a plastisol composition to be obtained is excellent in storage stability, a shaped article to be obtained has excellent chipping resistance, and a coating film to be obtained has excellent strength and hence this is preferable.

The aforementioned polymer (a) and polymer (b) may contain, besides these (meth)acrylate monomer units, units of another monomer copolymerizable with monomers constituting these monomer units from the viewpoints of cost and control of Sp value and Tg.

As such monomer units, for example, monomer units of styrene derivatives such as styrene, α-methyl styrene, β-methyl styrene, o-methyl styrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene, and p-phenyl styrene; polyfunctional monomers such as (poly)ethylene glycol di(meth)acrylate, propylene glycol di(meth)acrylate, 1,6-hexanediol di(meth)acrylate, trimethylolpropane tri(meth)acrylate, divinylbenzene, divinylnaphthalene, and divinyl ether; itaconic acid; crotonic acid; maleic acid derivatives such as maleic acid, maleate ester, and maleic anhydride; fumaric acid derivatives such as fumaric acid and fumarate ester; and triallyl isocyanurate can be mentioned.

The aforementioned polymer (a) and polymer (b) may further contain monomer units having functional groups which react with an adhesive component. When these polymers contain monomer units which react with an adhesive component, it is possible to improve adhesive properties of a coating film to be obtained from the plastisol composition to a base material. Such monomer units having functional groups which react with an adhesive component include monomer units of hydroxyl group-containing (meth)acrylates such as 2-hydroxyethyl(meth)acrylate, 2-hydroxypropyl(meth)acrylate, and 4-hydroxybutyl(meth)acrylate; and carbonyl group-containing (meth)acrylates such as acetoacetoxyethyl(meth)acrylate. These compounds can be used alone or in a combination of two or more kinds.

It is preferable that the monomer units having functional groups which react with an adhesive component be contained in both of the polymer (a) and polymer (b) because adhesive properties of coating films to be obtained can be improved. A mass ratio of a monomer mixture constituting the monomer units having functional groups which react with an adhesive component to a monomer mixture constituting monomer units not having functional groups which react with an adhesive component is preferably 25/75 to 100/0.

In addition, the aforementioned polymer (a) and polymer (b) may further contain monomer units having functional groups which give adhesive properties at the time of formation of coating films. When these polymers contain monomer units which give adhesive properties, it is possible to reduce the amount of an adhesive to be compounded to the plastisol composition. Such monomer units which give adhesive properties include monomer units constituting aliphatic amino (meth)acrylates such as dimethylaminoethyl(meth)acrylate and diethylaminoethyl(meth)acrylate; vinyl compounds having a heterocyclic ring such as alicyclic amino(meth)acrylate, N-vinyl imidazole, 2-vinyl pyridine, 4-vinyl pyridine, N-vinyl carbazole, N-vinyl and N-vinyl pyrrolidone; vinyl aniline, vinyl benzylamine, allylamine, and aminostyrene. These compounds can be used alone or in a combination of two or more kinds.

Among them, units of a heterocyclic compound having a nitrogen atom are preferable because adhesive properties can be realized with a small amount of addition. In particular, units of a heterocyclic compound having a small steric hindrance of the non-covalent electron pair on the nitrogen atom are preferable, and specifically, N-vinyl imidazole units can be mentioned.

As for the (meth)acrylic [Preparation of the polymer particle]

In 2 liter four-necked flask equipped with a thermometer, nitrogen gas introduction pipe, stirrer, dropping funnel, and cooling pipe, 408 g of pure water was introduced, and nitrogen gas was sufficiently passed through it for 30 minutes to replace dissolved oxygen in the pure water. After the passing of nitrogen gas was stopped, an inside temperature was raised to 80° C. while the contents was stirred at 200 rpm. When the inside temperature reached 80° C., a monomer mixture (M1) of 20 g of methyl methacrylate and 15g of n-butyl methacrylate, and 0.3 g of potassium persulfate as an initiator were added and polymerization was carried out for one hour. Subsequently, a monomer mixture (M2) of 207 g of methyl methacrylate, 195 g of t-butyl methacrylate, 4.2 g of sodium dialkyl sulfosuccinate (PELEX OT-P, manufactured by Kao Corporation), and 201 g of pure water, as the monomer mixture (A), was added dropwise. polymer particle having such a polymer (a) and polymer (b), a mass average molecular weight is preferably 10,000 or more and less than 5,000,000. When the mass average molecular weight is 10,000 or more, storage stability of the plastisol composition can be improved and, as a preferable result of it, a shaped article thus obtained from the plastisol composition has a high strength. On the other hand, when the mass average molecular weight is less than 5,000,000, the plastisol composition easily gelates by heating at the time of shaping. Further, when the mass average molecular weight is less than 2,000,000, coating films to be obtained from the plastisol composition compounded with a filler such as calcium carbonate tend to have an excellent strength.

A mass ratio of the aforementioned polymer (a) to the aforementioned polymer (b) is preferably from 65/35 to 95/5. When the mass ratio of the polymer (a) is 65% by mass or more, coating films having a high flexibility and a high chipping resistance tend to be obtained. When the mass ratio of the polymer (a) is 95% by mass or less, storage stability of the plastisol composition tends to become good. In addition, the occupation rate of the polymer (a) in the whole (meth)acrylic polymer particle is preferably in the range of from 50 to 90% by mass, and the occupation rate of the polymer (b) in the whole (meth)acrylic polymer particle is preferably in the range of from 5 to 40% by mass. The total of these rates is 100% by mass or less.

A particle diameter of the (meth)acrylic polymer particle of the present invention is preferably 0.1 µm or more and 2.0 µm or less. When the particle diameter is 0.1 µm or more, sufficient thickness for suppressing absorption of the plasticizer in the plastisol composition can be secured and, as a preferable result of it, storage stability of the plastisol composition becomes good. When the particle diameter is 2.0 µm or less, thixotropy tends to occur and the plastisol composition having excellent resistance to sagging can be obtained.

As for the particle diameter, a measured value, namely a median diameter, obtained with Laser Scattering Particle Size Distribution Analyzer LA-910 manufactured by Horiba Instruments, Inc. can be adopted.

In the method for producing the (meth)acrylic polymer particle of the present invention, the aforementioned monomer or monomer mixture (A), which becomes monomer units of the aforementioned polymer (a), is prepared, and then this is polymerized to form the polymer (a). The monomer or monomer mixture (A) can be prepared by mixing and stirring, and if necessary by heating, of the aforementioned (meth)acrylate or a derivative thereof, and if necessary, a monomer having a functional group which is copolymerizable with them and reacts with an adhesive component, a monomer such as an adhesive component which is copolymerizable with them and has adhesive properties, or various kinds of additives. As for polymerization of the aforementioned monomer mixture (A), for example, an emulsion polymerization method, seed polymerization method, soap-free polymerization method, dispersion polymerization method, or micro suspension polymerization method can be used. A (meth)acrylic polymer particle dispersion liquid containing the polymer (a) and polymer (b) is formed by addition of a monomer or monomer mixture (B), which constitutes monomer units of the aforementioned polymer (b), to a thus obtained dispersion liquid of the polymer (a) followed by polymerization thereof. The monomer or monomer mixture (B) to be added to the dispersion liquid of the polymer (a) can also be prepared by mixing and stirring, and if necessary by heating, of the aforementioned (meth)acrylate or a derivative thereof, and if necessary, a monomer having a functional group which is copolymerizable with them and reacts with an adhesive component, a monomer such as an adhesive component which is copolymerizable with them and has adhesive properties, or various kinds of additives. Subsequently, the (meth)acrylic polymer particle dispersion liquid is made into powder by a spray drying method, an acid coagulation or salt coagulation followed by a drying process, a lyophilization method, or a centrifugal separation method, and the (meth)acrylic polymer particle can be prepared. The (meth)acrylic polymer particle may have a structure of secondary particle in which many polymer particles are aggregated or a structure of a high degree particle having polymer particles aggregated in higher degree. In that case, the aggregated particles are preferably loosely aggregated, with primary particles not being firmly bonded. This is because the (meth)acrylic polymer particle can be uniformly dispersed as a primary particle by destruction of the high degree particle by shear in the mixing step at the time of formation of the plastisol composition.

A particle diameter of the secondary particle of the (meth)acrylic polymer particle is preferably 5 µm or more and less than 500 µm. The particle diameter of 5 µm or more is preferable because handling properties at the time of operation become good. When the particle diameter is less than 500 µm, it is possible to reduce the (meth)acrylic polymer particle which remains behind as a form of lump without being dispersed in the plastisol composition, and films and thin-film shaped articles to be formed using the plastisol composition can have smooth surfaces.

In the method for producing the (meth)acrylic polymer particle of the present invention, it is also possible to produce the (meth)acrylic polymer particle containing plural kinds of polymers (b) by sequential polymerization of two or more monomers or monomer mixtures (B) in the presence of the polymer (a) after the polymerization of the aforementioned monomer or monomer mixture (A). In addition, it is also possible to produce the (meth)acrylic polymer particle containing the polymer (a), the polymer (b), and another polymer by way of polymerization after addition of another monomer mixture to the (meth)acrylic polymer particle dispersion liquid obtained by formation of the polymer (b) in the presence of the polymer (a), as long as function of the polymer (a) or polymer (b) is not deteriorated.

In addition, polymerization of another monomer mixture (S) may be carried out prior to the polymerization of the monomer or monomer mixture (A), as long as functions of the polymer (a) and polymer (b) are not deteriorated. The other monomer mixture (S) is preferably the one having a (meth) acrylic acid ester of an alcohol with 1 to 4 carbon atoms as an essential component because the balance of hydrophobicity and hydrophilicity becomes appropriate. In addition, the other monomer mixture (S) is preferably used in the range of from 1 to 10% by mass relative to the amount of all the monomers to be used.

In addition, polymerization of another monomer mixture (C) may be carried out after the polymerization of the monomer or monomer mixture (A) and before the addition of the monomer or monomer mixture (B) which constitutes the monomer units of the aforementioned polymer (b), as long as functions of the polymer (a) and polymer (b) are not deteriorated. The other monomer mixture (C) is preferably the one having a (meth)acrylic acid ester of an alcohol with 1 to 4 carbon atoms as an essential component because the balance of hydrophobicity and hydrophilicity becomes appropriate. In addition, the other monomer mixture (C) can be used in the range of from 0 to 30% by mass relative to the amount of all the monomers to be used. All the aforementioned polymerizations are preferably carried out in water. In that case, a polymerization initiator to be used is not particularly limited, and examples thereof include publicly known polymerization initiators such as potassium persulfate and ammonium persulfate.

In addition, when the polymerization is carried out in water, anionic surfactants such as sodium dialkyl sulfosuccinate ("PELEX OT-P" manufactured by Kao Corp.) and sodium lauryl sulfate ester ("EMAL 2F" manufactured by Kao Corp.) and nonionic surfactants such as polyoxyethylene lauryl ether ("EMULGEN 106") can be used as emulsifiers.

The aforementioned polymerization is preferably carried out at 60 to 90° C. for 0.1 to 5 hours.

The plastisol composition of the present invention contains the aforementioned (meth)acrylic polymer particle and a plasticizer. As for the plastisol composition, gelation caused by absorption of the plasticizer during storage can be suppressed and a sol state can be maintained for a long time owing to containing of the aforementioned (meth)acrylic polymer particle.

The plasticizer to be used for the plastisol composition of the present invention contains 60% by mass or more of a plasticizer having a solubility parameter in the range of 18.40 $(J/cm^3)^{1/2}$ or above and lower than 18.71 $(J/cm^3)^{1/2}$. When the plasticizer having a solubility parameter of 18.40 $(J/cm^3)^{1/2}$ or above is used, bleeding of the plasticizer from a film formed can be suppressed. When the plasticizer having a solubility parameter of lower than 18.71 $(J/cm^3)^{1/2}$ is used, the plastisol composition can suppress gelation of the (meth) acrylic polymer particle and can have excellent storage stability. When the plasticizer contains 60% by mass or more of a plasticizer having such a solubility parameter, the plastisol composition can have excellent storage stability even in the case that the polymer (a), which is the core component of the (meth)acrylic polymer particle, is increased, and the shaped article shaped therefrom can have chipping resistance.

In addition, the plasticizer to be used for the plastisol composition of the present invention preferably contains 1% by mass or more and less than 40% by mass of a plasticizer having a solubility parameter in the range of 18.71 $(J/cm^3)^{1/2}$ or above and lower than 20.45 $(J/cm^3)^{1/2}$. When the plasticizer contains 1% by mass or more of a plasticizer having a solubility parameter in the range of 18.71 $(J/cm^3)^{1/2}$ or above and lower than 20.45 $(J/cm^3)^{1/2}$, the shaped article shaped from the plastisol composition strongly tends to have excellent chipping resistance, and when the plasticizer contains less than 40% by mass, lowering of storage stability of the plastisol composition can be suppressed.

As for a solubility parameter of the plasticizer, one obtained by the aforementioned Fedors method is adopted. Specifically, solubility parameters of some plasticizers are shown in Table 2. To obtain the plasticizer having the solubility parameter in the aforementioned range, it is possible to use the plasticizer having the solubility parameter in the aforementioned range or to combine various plasticizers for adjustment of the composition in order to make the solubility parameter fall in the aforementioned range.

TABLE 2

| Plasticizer | Sp value | |
|---|---|---|
| | $(J/cm^3)^{1/2}$ | $(cal/cm^3)^{1/2}$ |
| DINP | 18.53 | 9.06 |
| DEHP | 18.60 | 9.10 |
| DIDP | 18.46 | 9.03 |
| ATBC | 20.07 | 9.82 |

DINP: Diisononyl phthalate
DEHP: Diethylhexyl phthalate
DIDP: Diisodecyl phthalate
ATBC: Acetyltributyl citrate.

Such plasticizers specifically include phthalate ester-type plasticizers such as dimethyl phthalate, diethyl phthalate, dibutyl phthalate, diheptyl phthalate, di-2-ethylhexyl phthalate, di-n-octyl phthalate, diisononyl phthalate, diisodecyl phthalate, and butyl benzyl phthalate; adipate ester-type plasticizers such as dimethyl adipate, dibutyl adipate, diisobutyl adipate, dihexyl adipate, di-2-ethylhexyl adipate, diisononyl adipate, and dibutyl diglycol adipate; phosphate ester-type plasticizers such as trimethyl phosphate, triethyl phosphate, tributyl phosphate, tri-2-ethylhexyl phosphate, tributoxyethyl phosphate, triphenyl phosphate, tricresyl phosphate, trixylenyl phosphate, and cresylphenyl phosphate; trimellitate ester-type plasticizers such as tri-2-ethylhexyl trimellitate; sebacate ester-type plasticizers such as dimethyl sebacate, dibutyl sebacate, and di-2-ethyl hexyl sebacate; aliphatic polyester-type plasticizers such as poly-1,3-butanediol adipate; benzoic acid-type plasticizers such as diethylene glycol dibenzoate and dibutylene glycol dibenzoate; epoxidized ester-type plasticizers such as epoxidized soybean oil; alkyl sulfonic acid phenyl ester-type plasticizers such as alkyl sulfonic acid phenyl ester; alicyclic dibasic acid ester-type plasticizers; polyether-type plasticizers such as polypropylene glycol and polybutylene glycol; and citrate-type plasticizers such as acetyl tributyl citrate. These plasticizers can be used alone or in a combination of two or more kinds as mentioned above. Among them, dioctyl phthalate, diisononyl phthalate, diisodecyl phthalate, Mesamoll, and acetyl tributyl citrate are preferable from the viewpoints of solubility parameter, economy, safety, and availability.

The content of the (meth)acrylic polymer particle in the plastisol composition is preferably 5% by mass or more and less than 70% by mass. When the content of the (meth)acrylic polymer particle is 5% by mass or more, the obtained films or shaped articles have excellent strength, and when the content is less than 70% by mass, viscosity of the plastisol composition becomes low and hence the plastisol composition has excellent processability.

The aforementioned plastisol composition preferably contains calcium carbonate. It is preferable that the plastisol composition contain calcium carbonate because tuck of the obtained films or shaped articles tend to be suppressed. In addition, cost of raw materials for plastisol composition can be reduced. The content of calcium carbonate in the plastisol composition is preferably 5% by mass or more.

In addition, the plastisol composition may contain other additives, if necessary, as long as they do not deteriorate the function of the plastisol composition. Specifically, examples thereof include pigments such as titanium oxide and carbon black, antifoamers, mildewproofing agents, deodorants, antimicrobials, surfactants, lubricants, ultraviolet absorbents, spices, foaming agents, leveling agents, adhesives, viscosity reducing agents, and diluents.

As apparatus for preparing the aforementioned plastisol composition, those publicly known can be used, and examples thereof include Pony mixer, Change-can mixer, Hobart mixer, a planetary mixer, a butterfly mixer, an automatic mortar, and a kneader.

The plastisol composition of the present invention can be used as both a coating material and a shaping material and is particularly useful as a coating material. The shaping method thereof may be any method available, however, as a method for forming films, a method for forming a coating film by a dip coating method, spray coating method, knife coating method, roll coating method, curtain flow coating method, brush painting method, and electrostatic coating method followed by calcination thereof can be mentioned.

The article of the present invention may be any article as long as it is obtained by use of the aforementioned plastisol composition, and examples thereof include shaped articles such as wall papers, steel sheets coated with a vinyl resin, leather, dolls, toys, gloves, flooring materials, sponge products, automobile parts, and industrial machinery parts, and in particular, coating materials such as automotive undercoat materials and body sealers.

EXAMPLES

Hereinafter, the present invention will be explained in more detail by examples. However, the technical scopes of the present invention are not limited to these examples.

Example 1

[Preparation Of The Polymer Particle]

In 2 liter four-necked flask equipped with a thermometer, nitrogen gas introduction pipe, stirrer, dropping funnel, and cooling pipe, 408 g of pure water was introduced, and nitrogen gas was sufficiently passed through it for 30 minutes to replace dissolved oxygen in the pure water. After the passing of nitrogen gas was stopped, an inside temperature was raised to 80° C. while the contents was stirred at 200 rpm. When the inside temperature reached 80° C., a monomer mixture (M1) of 20 g of methyl methacrylate and 15g of n-butyl methacrylate, and 0.3 g of potassium persulfate as an initiator were added and polymerization was carried out for one hour. Subsequently, a monomer mixture (M2) of 207 g of methyl methacrylate, 195 g of t-butyl methacrylate, 4.2 g of sodium dialkyl sulfosuccinate (PELEX OT-P, manufactured by Kao Corporation), and 201 g of pure water, as the monomer mixture (A), was added dropwise.

Subsequently, the system was maintained for one hour after heat release caused by polymerization of (M2) was not observed, and a monomer mixture (M3) of 81 g of methyl methacrylate, 39 g of i-butyl methacrylate, 1.2 g of sodium dialkyl sulfosuccinate (PELEX OT-P, manufactured by Kao Corporation), and 60 g of pure water was introduced.

Subsequently, the system was maintained for one hour after heat release caused by polymerization of (M3) was not observed, and a monomer mixture (M4) of 60 g of methyl methacrylate, 0.6 g of sodium dialkyl sulfosuccinate (PELEX OT-P, manufactured by Kao Corporation), and 30 g of pure water, as the monomer mixture (B), was introduced.

Further, the system was maintained for one hour after heat release caused by polymerization of (M4) was not observed, and a monomer mixture (M5) of 10.3 g of methyl methacrylate, 6.29 g of i-butyl methacrylate, 1.37 g of N-vinyl imidazole, 0.2 g of sodium dialkyl sulfosuccinate (PELEX OT-P, manufactured by Kao Corporation), and 9.0 g of pure water, as the monomer mixture (M5), was introduced. Subsequently, the stirring of the system was continued at 80° C. for 1 hour to obtain a polymer particle dispersion liquid (E1).

The polymer particle dispersion liquid (E1) was spray dried with a L-8 type spray dryer manufactured by Ohkawara Kakohki Co., Ltd. under the conditions of inlet temperature of 150° C., outlet temperature of 60° C., and a disk revolution number of 25,000 rpm to obtain a polymer particle (P1).

The mixed ratio of each monomer mixture used for a preparation of the polymer particle, solubility parameter and Tg of each monomer mixture and obtained polymer particle are shown in Table 5.

The molecular weight and the particle diameter of each obtained polymer particle were measured by the following methods.

[Molecular Weight of the Polymer Particle]

The molecular weight (Mw) of the polymer particle (P1) was measured in terms of a polystyrene standard resin using gel permeation chromatography (GPC), and it was 750,000.

[Particle Diameter of the Polymer Particle]

Particle diameter of the polymer particle obtained was measured with Laser Scattering Particle Size Distribution Analyzer LA-910 manufactured by Horiba Ltd. A median diameter based on a volume standard was used for the particle diameter in the present specification. Relative refractive index of the polymer and the dispersion medium were all assumed to be 1.12. Ion-exchanged water was used for the dispersion medium. Results are shown in Table 5.

[Preparation of the Plastisol Composition]

Two hundred parts of calcium carbonate (NS200, manufactured by Nitto Funka Kogyo K.K.), 50 parts of calcium carbonate (CCR, manufactured by Shiraishi Kogyo Kaisha, Ltd.), and 180 parts of diisononyl phthalate (manufactured by J-Plus Co., Ltd.) as a plasticizer were mixed with a vacuum mixer ARV-200 (manufactured by Thinky Corporation) for 10 seconds under atmospheric pressure (0.1 MPa), and then mixed under a reduced pressure at 2.7 kPa for 170 seconds to obtain a mixture of calcium carbonate and the plasticizer.

Subsequently, 100 parts of a polymer particle (P1) was added thereto, and mixing with the vacuum mixer was further continued for 10 seconds under atmospheric pressure of 0.1 MPa, and then mixed under a reduced pressure at 2.7 kPa for 110 seconds to obtain a plastisol composition. In regard to the plastisol composition thus obtained, chipping resistance, storage stability (rate of thickening), adhesive strength, and anti-sagging property were evaluated as follows. The results are shown in Table 7.

[Chipping Resistance]

The plastisol composition thus obtained was coated on a cationic electrodeposition plate having a length of 150 mm, width of 70 mm, and thickness of 0.8 mm (manufactured by Japan Root Service Co., Ltd.), and the resultant plate was heated at 130° C. (in the cases of Examples 1 to 6 and Comparative Examples of 1 to 5) or 140° C. (in the cases of Examples 7 to 10 and Comparative Examples of 6 and 7) for 30 minutes, and a film having a thickness of 1 mm was formed. A notch of 2 mm in length and 4 mm in width was made thereon to prepare a test piece, and the test piece was placed at an angle of 60 degrees from the horizontal direction.

A test of causing a brass nut of M4 size having a weight of 3 kg to collide with the test piece at the notch by dropping of the nut from a height of 2 m through a polyvinyl chloride pipe having a diameter of 20 mm was repeated until the test piece breaks and the base material is exposed, the total weight of the nut dropped was calculated. Chipping resistance was evaluated by the following standard.

"⊚": 25 kg or more
"○": 20 kg or more and less than 25 kg
"Δ": 12 kg or more and less than 20 kg
"X": Less than 12 kg

[Anti-Sagging Property]

The plastisol composition thus obtained was kept warm in a thermostatic chamber at 25° C. for 2 hours, and viscosity (α) in a unit of Pa·s was measured with a BH type viscometer having a rotor of a special corn with cone angle of 3 degrees (manufactured by Tokyo Keiki Co., Ltd.) while the rotor was rotated at a number of revolution of 4 rpm, at a time 1 minute later from the start of the rotation. From the viscosity thus obtained at a low shear, anti-sagging property was evaluated by the following standard.

"⊚": 60 Pa·s or more
"X": Less than 60 Pa·s

[Storage Stability (Rate of Thickening)]

The plastisol composition was kept at 40° C. for 10 days, and viscosity (β) was measured in the same manner as in the case of the initial viscosity (α), and rate of thickening (%) was obtained by the equation (3) described below from this value and the initial viscosity (α). From the rate of thickening thus obtained, storage stability was evaluated by the following standard.

$$\text{Rate of thickening}(\%) = [(\beta - \alpha)/\alpha] \times 100 \quad (3)$$

"⊚": Less than 0%
"○": 0% or more and less than 100%
"X": 100% or more

[Adhesive Strength]

Two cationic electrodeposition plates, each of which has a length of 70 mm, width of 25 mm, and thickness of 0.8 mm manufactured by Japan Root Service Co., Ltd., were placed, with each long side being superimposed in the length of 45 mm, the plastisol composition obtained was applied to a central portion between the two plates in the size having a length of 25 mm, width of 25 mm, and thickness of 3 mm, and the resultant plates were heated at 140° C. for 30 minutes to obtain a test plate pair. The two plates of the test plate pair thus obtained were drawn in the long side direction opposite to each other, and shear adhesive strength was measured and evaluated by the following standard. Tensilon universal testing machine RTC1250A (manufactured by A&D Company, Limited) was used for this test.

"○": 1.0 MPa or more
"Δ": 0.4 MPa or more and less than 1.0 MPa

Example 2

The same procedure as in Example 1 was carried out except that the monomer mixtures (M2) to (M5) to be added after the addition of the initiator were changed to the monomer mixtures (M2) to (M5) shown in Table 3 to obtain a polymer particle (P2). The mixed ratio of each monomer mixture used for the preparation of the polymer particle, solubility parameters and Tg's of each monomer mixture and the obtained polymer particle are shown in Table 5.

The same procedure as in Example 1 was carried out except that the polymer particle (P2) thus obtained was used to prepare a plastisol composition, and chipping resistance, storage stability (rate of thickening), adhesive strength, and anti-sagging property were evaluated. The results are shown in Table 7.

Example 3

The same procedure as in Example 1 was carried out except that the monomer mixtures (M2) to (M5) to be added after the addition of the initiator were changed to the monomer mixtures (M2) to (M5) shown in Table 3 to obtain a polymer particle (P3). The mixed ratio of each monomer mixture used for the preparation of the polymer particle, solubility parameters and Tg's of each monomer mixture and the obtained polymer particle are shown in Table 5.

The same procedure as in Example 1 was carried out except that the polymer particle (P3) thus obtained was used to prepare a plastisol composition, and chipping resistance, storage stability (rate of thickening), adhesive strength, and anti-sagging property were evaluated. The results are shown in Table 7.

Comparative Examples 1 to 4

In each of Comparative Examples 1 to 4, the same procedure as in Example 1 was carried out except that the monomer mixtures (M2) to (M5) to be added after the addition of the initiator were changed to the monomer mixtures (M2) to (M5) shown in Table 3 to obtain respective polymer particles (P4) to (P7). The mixed ratio of each monomer mixture used for the preparation of each polymer particle, solubility parameters and Tg's of each monomer mixture and the obtained polymer particle are shown in Table 5.

The same procedure as in Example 1 was carried out except that each of the polymer particles (P4) to (P7) thus obtained was used to prepare each plastisol composition, and chipping resistance, storage stability (rate of thickening), adhesive strength, and anti-sagging property were evaluated. The results are shown in Table 7.

Example 4

The same procedure as in Example 1 was carried out except that the polymer particle (P1) was used and 180 parts of DINP as the plasticizer was changed to a mixture of 160 parts of DINP and 20 parts of ATBC manufactured by Dainippon Ink & Chemicals, Inc. to prepare a plastisol composition, and chipping resistance, storage stability (rate of thickening), adhesive strength, and anti-sagging property were evaluated. The results are shown in Table 7.

Example 5

The same procedure as in Example 1 was carried out except that the monomer mixtures (M2) to (M4) to be added after the addition of the initiator were changed to the monomer mixtures (M2) to (M4) shown in Table 4 to obtain a polymer particle (P8). The mixed ratio of each monomer mixture used for the preparation of the polymer particle, solubility parameters and Tg's of each monomer mixture and the obtained polymer particle are shown in Table 6.
[Preparation of the Plastisol Composition]

One hundred parts of calcium carbonate (NS200, manufactured by Nitto Funka Kogyo K.K.), 150 parts of calcium carbonate (CCR, manufactured by Shiraishi Kogyo Kaisha, Ltd.), 180 parts of diisononyl phthalate (DINP, manufactured by J-Plus Co., Ltd.), 20 parts of Mesamoll as plasticizers, 40 parts of Takenate D-7040 (manufactured by Mitsui Chemicals Polyurethanes, Inc.) as an adhesive, and 1.76 parts of ADH (manufactured by Japan Hydrazine Company, Inc.) as a curing agent were mixed with a vacuum mixer ARV-200 (manufactured by Thinky Corporation) for 10 seconds under atmospheric pressure of 0.1 MPa, and then mixed under a reduced pressure at 2.7 kPa for 170 seconds to obtain a mixture of calcium carbonate, the plasticizers, the adhesive, and the curing agent. Subsequently, 100 parts of a polymer particle (P8) was added thereto, and mixing with the vacuum mixer was further continued for 10 seconds under atmospheric pressure of 0.1 MPa, and then mixed under a reduced pressure at 2.7 kPa for 110 seconds to obtain a plastisol composition. In regard to the plastisol composition thus obtained, chipping resistance, storage stability (rate of thickening), adhesive strength, and anti-sagging property were evaluated in the same manner as in Example 1. The results are shown in Table 8.

Example 6

The same procedure as in Example 1 was carried out except that the monomer mixtures (M2) to (M4) to be added after the addition of the initiator were changed to the monomer mixtures (M2) to (M4) shown in Table 4 to obtain a polymer particle (P9). The mixed ratio of each monomer mixture used for the preparation of the polymer particle, solubility parameters and Tg's of each monomer mixture and the obtained polymer particle are shown in Table 6.

The same procedure as in Example 5 was carried out except that the polymer particle (P9) thus obtained was used to prepare a plastisol composition, and chipping resistance, storage stability (rate of thickening), adhesive strength, and anti-sagging property were evaluated. The results are shown in Table 8.

Example 7

The same procedure as in Example 1 was carried out except that the monomer mixtures (M2) to (M4) to be added after the addition of the initiator were changed to the monomer mixtures (M2) to (M4) shown in Table 4 to obtain a polymer particle (P10). The mixed ratio of each monomer mixture used for the preparation of the polymer particle, solubility parameters and Tg's of each monomer mixture and the obtained polymer particle are shown in Table 6.

The same procedure as in Example 5 was carried out except that the polymer particle (P10) thus obtained was used to prepare a plastisol composition, and chipping resistance, storage stability (rate of thickening), adhesive strength, and anti-sagging property were evaluated. The results are shown in Table 8.

Example 8

The same procedure as in Example 1 was carried out except that the monomer mixtures (M2) to (M4) to be added after the addition of the initiator were changed to the monomer mixtures (M2) to (M4) shown in Table 4 to obtain a polymer particle (P11). The mixed ratio of each monomer mixture used for the preparation of the polymer particle, solubility parameters and Tg's of each monomer mixture and the obtained polymer particle are shown in Table 6.

The same procedure as in Example 5 was carried out except that the polymer particle (P11) thus obtained was used to prepare a plastisol composition, and chipping resistance, storage stability (rate of thickening), adhesive strength, and anti-sagging property were evaluated. The results are shown in Table 8.

Comparative Examples 5 and 6

In each of Comparative Examples 5 and 6, the same procedure as in Example 1 was carried out except that the monomer mixtures (M2) to (M4) to be added after the addition of the initiator were changed to the monomer mixtures (M2) to (M4) shown in Table 4 to obtain respective polymer particles (P12) and (P13). The mixed ratio of each monomer mixture used for the preparation of each polymer particle, solubility parameters and Tg's of each monomer mixture and the obtained polymer particle are shown in Table 6.

The same procedure as in Example 5 was carried out except that each of the polymer particles (P12) and (P13) thus obtained was used to prepare a plastisol composition, and chipping resistance, storage stability (rate of thickening), adhesive strength, and anti-sagging property were evaluated. The results are shown in Table 8.

Example 9

The same procedure as in Example 1 was carried out except that the polymer particle (P1) was used and 180 parts of DINP as the plasticizer was changed to a mixture of 170 parts of DINP and 10 parts of acetyl tributyl citrate (ATBC) (manufactured by Dainippon Ink & Chemicals, Inc.) to prepare a plastisol composition, and chipping resistance, storage stability (rate of thickening), adhesive strength, and anti-sagging property were evaluated. The results are shown in Table 7.

TABLE 3

|  |  |  | P1 | P2 | P3 | P4 | P5 | P6 | P7 |
|---|---|---|---|---|---|---|---|---|---|
| Initial Feed (M1) | Monomer (g) | MMA | 20 | 20 | 20 | 20 | 20 | 20 | 20 |
|  |  | nBMA | 15 | 15 | 15 | 15 | 15 | 15 | 15 |
| Dropped monomer mixture 1 (M2) | Monomer (g) | MMA | 207 | 166 | 268 | 166 | 166 | 207 | 362 |
|  |  | nBMA | 0 | 0 | 0 | 116 | 0 | 0 | 0 |
|  |  | iBMA | 0 | 0 | 0 | 0 | 236 | 0 | 0 |
|  |  | tBMA | 195 | 236 | 253 | 0 | 0 | 195 | 40 |
|  |  | 2HEMA | 0 | 0 | 0 | 0 | 0 | 0 | 0 |
|  | Emulsifier (g) | PELEX OT-P | 4.2 | 4.2 | 5.4 | 3 | 4.2 | 4.2 | 4.2 |
|  | Pure water (g) |  | 201 | 201 | 261 | 141 | 201 | 201 | 201 |
| Dropped monomer mixture 2 (M3) | Monomer (g) | MMA | 81 | 81 | 0 | 163 | 81 | 122 | 81 |
|  |  | iBMA | 39 | 39 | 0 | 77 | 39 | 58.5 | 39 |
|  |  | 2HEMA | 0 | 0 | 0 | 0 | 0 | 0 | 0 |
|  | Emulsifier (g) | PELEX OT-P | 1.2 | 1.2 | 0 | 2.4 | 1.2 | 1.8 | 1.2 |
|  | Pure water (g) |  | 60 | 60 | 0 | 120 | 60 | 90 | 60 |
| Dropped monomer mixture 3 (M4) | Monomer (g) | MMA | 60 | 60 | 60 | 60 | 60 | 0 | 60 |
|  |  | 2HEMA | 0 | 0 | 0 | 0 | 0 | 0 | 0 |
|  | Emulsifier (g) | PELEX OT-P | 0.6 | 0.6 | 0.6 | 0.6 | 0.6 | 0 | 0.6 |
|  | Pure water (g) |  | 30 | 30 | 30 | 30 | 30 | 0 | 30 |
| Dropped monomer mixture 4 (M5) | Monomer (g) | MMA | 10.3 | 10.3 | 10.3 | 10.3 | 10.3 | 7.34 | 10.3 |
|  |  | iBMA | 6.29 | 6.29 | 6.29 | 6.29 | 6.29 | 9.29 | 6.29 |
|  |  | NVImd | 1.37 | 1.37 | 1.37 | 1.37 | 1.37 | 1.37 | 1.37 |
|  | Emulsifier (g) | PELEX OT-P | 0.18 | 0.18 | 0.18 | 0.18 | 0.18 | 0.18 | 0.18 |
|  | Pure water (g) |  | 9 | 9 | 9 | 9 | 9 | 9 | 9 |

MMA: Methyl methacrylate manufactured by Mitsubishi Rayon Co., Ltd.
nBMA: n-Butyl methacrylate manufactured by Mitsubishi Rayon Co., Ltd.
iBMA: i-Butyl methacrylate manufactured by Mitsubishi Rayon Co., Ltd.
tBMA: t-Butyl methacrylate manufactured by Mitsubishi Rayon Co., Ltd.
IBMXA: Isobornyl methacrylate manufactured by Mitsubishi Rayon Co., Ltd.
2HEMA: 2-Hydroxyethyl methacrylate manufactured by Mitsubishi Rayon Co., Ltd.
NVImd: N-Vinylimidazole manufactured by BASF AG
PELEX OT-P: Sodium dialkyl sulfosuccinate manufactured by Kao Corporation

TABLE 4

|  |  |  | P8 | P9 | P10 | P11 | P12 | P13 |
|---|---|---|---|---|---|---|---|---|
| Initial Feed (M1) | Monomer (g) | MMA | 20 | 20 | 20 | 20 | 20 | 20 |
|  |  | nBMA | 15 | 15 | 15 | 15 | 15 | 15 |
| Dropped monomer mixture 1 (M2) | Monomer (g) | MMA | 207 | 207 | 206 | 200 | 166 | 249 |
|  |  | nBMA | 0 | 0 | 0 | 0 | 235 | 152 |
|  |  | iBMA | 0 | 0 | 0 | 0 | 0 | 0 |
|  |  | tBMA | 195 | 195 | 195 | 189 | 0 | 0 |
|  |  | 2HEMA | 0.0 | 0.0 | 1.4 | 13 | 0.0 | 0.0 |
|  | Emulsifier (g) | PELEX OT-P | 4.2 | 4.2 | 4.2 | 4.2 | 4.2 | 4.2 |
|  | Pure water (g) |  | 201 | 201 | 201 | 201 | 201 | 201 |
| Dropped monomer mixture 2 (M3) | Monomer (g) | MMA | 81 | 81 | 81 | 79 | 81 | 81 |
|  |  | iBMA | 39 | 38 | 38 | 37 | 39 | 39 |
|  |  | 2HEMA | 0.0 | 1.4 | 0.4 | 4.1 | 0.0 | 0.0 |
|  | Emulsifier (g) | PELEX OT-P | 1.2 | 1.2 | 1.2 | 1.2 | 1.2 | 1.2 |
|  | Pure water (g) |  | 60 | 60 | 60 | 60 | 60 | 60 |
| Dropped monomer mixture 3 (M4) | Monomer (g) | MMA | 58 | 59 | 60 | 58 | 58 | 58 |
|  |  | 2HEMA | 2.2 | 0.8 | 0.3 | 2.2 | 2.2 | 2.2 |
|  | Emulsifier (g) | PELEX OT-P | 0.6 | 0.6 | 0.6 | 0.6 | 0.6 | 0.6 |
|  | Pure water (g) |  | 30 | 30 | 30 | 30 | 30 | 30 |

TABLE 5

|  |  | P1 | P2 | P3 | P4 | P5 | P6 | P7 |
|---|---|---|---|---|---|---|---|---|
| Initial feed (M1) | Tg (° C.) | 63.2 | 63.2 | 63.2 | 63.2 | 63.2 | 63.2 | 63.2 |
|  | Sp value $(J/cm^3)^{1/2}$ | 19.98 | 19.98 | 19.98 | 19.98 | 19.98 | 19.98 | 19.98 |
|  | Mass ratio (%) | 5.5 | 5.5 | 5.5 | 5.5 | 5.5 | 5.5 | 5.5 |
| Dropped monomer mixture 1 (M2) | Tg (° C.) | 106 | 106.2 | 106 | 64.7 | 77.2 | 106 | 105.2 |
|  | Sp value $(J/cm^3)^{1/2}$ | 19.51 | 19.3 | 19.51 | 19.99 | 19.64 | 19.51 | 20.17 |
|  | Mass ratio (%) | 63.3 | 63.3 | 82.2 | 44.4 | 63.3 | 63.3 | 63.3 |
| Dropped monomer mixture 2 (M3) | Tg (° C.) | 89.1 | 89.1 | — | 89.3 | 89.1 | 89.1 | 89.1 |
|  | Sp value $(J/cm^3)^{1/2}$ | 19.98 | 19.98 | — | 19.98 | 19.98 | 19.98 | 19.98 |
|  | Mass ratio (%) | 18.9 | 18.9 | 0.0 | 37.8 | 18.9 | 28.3 | 18.9 |
| Dropped monomer mixture 3 (M4) | Tg (° C.) | 105 | 105 | 105 | 105 | 105 | — | 105 |
|  | Sp value $(J/cm^3)^{1/2}$ | 20.32 | 20.32 | 20.32 | 20.32 | 20.32 | — | 20.32 |
|  | Mass ratio (%) | 9.4 | 9.4 | 9.5 | 9.4 | 9.4 | 0.0 | 9.4 |
| Dropped monomer mixture 4 (M5) | Sp value $(J/cm^3)^{1/2}$ | 20.38 | 20.38 | 20.38 | 20.38 | 20.38 | 20.20 | 20.38 |
|  | Mass ratio (%) | 2.8 | 2.8 | 2.8 | 2.8 | 2.8 | 2.8 | 2.8 |
| Particle diameter (μm) |  | 0.85 | — | — | — | — | — | — |

TABLE 6

|  |  | P8 | P9 | P10 | P11 | P12 | P13 |
|---|---|---|---|---|---|---|---|
| Initial feed (M1) | Tg (° C.) | 63.2 | 63.2 | 63.2 | 63.2 | 63.2 | 63.2 |
|  | Sp value $(J/cm^3)^{1/2}$ | 19.98 | 19.98 | 19.98 | 19.98 | 19.98 | 19.98 |
|  | Mass ratio (%) | 5.7 | 5.7 | 5.7 | 5.7 | 5.7 | 5.7 |
| Dropped monomer mixture 1 (M2) | Tg (° C.) | 106 | 106 | 105.7 | 103.3 | 50.1 | 67.6 |
|  | Sp value $(J/cm^3)^{1/2}$ | 19.51 | 19.51 | 19.53 | 19.74 | 19.83 | 20.02 |
|  | Mass ratio (%) | 65.1 | 65.1 | 65.2 | 65.1 | 65.1 | 65.1 |
| Dropped monomer mixture 2 (M3) | Tg (° C.) | 89.1 | 88.7 | 89.20 | 87.30 | 89.1 | 89.1 |
|  | Sp value $(J/cm^3)^{1/2}$ | 19.98 | 20.06 | 20.00 | 20.20 | 19.98 | 19.98 |
|  | Mass ratio (%) | 19.4 | 19.5 | 19.3 | 19.5 | 19.5 | 19.5 |
| Dropped monomer mixture 3 (M4) | Tg (° C.) | 102 | 103.9 | 104.6 | 102 | 102 | 102 |
|  | Sp value $(J/cm^3)^{1/2}$ | 20.53 | 20.39 | 20.35 | 20.53 | 20.53 | 20.53 |
|  | Mass ratio (%) | 9.8 | 9.7 | 9.8 | 9.8 | 9.8 | 9.8 |

TABLE 7

|  | Polymer particle | Chipping resistance (kg) |  | Storage stability (Rate of thickening %) |  | Adhesive strength (MPa) |  | Anti-sagging property (Viscosity (Pa·s)) |  |
|---|---|---|---|---|---|---|---|---|---|
| Ex. 1 | P1 | 24 | ○ | −13 | ◎ | 1.5 | ○ | 100 | ○ |
| Ex. 2 | P2 | 23 | ○ | −12 | ◎ | 1.2 | ○ | 104 | ○ |
| Ex. 3 | P3 | 33 | ◎ | 15 | ○ | 1.2 | ○ | 94 | ○ |
| Ex. 4 | P1 | 36 | ◎ | 4 | ○ | 0.9 | Δ | 88 | ○ |
| Ex. 9 | P1 | 26 | ◎ | −2 | ◎ | 1.1 | ○ | 93 | ○ |
| Comp. Ex. 1 | P4 | 8 | X | −11 | ◎ | 0.4 | Δ | 106 | ○ |
| Comp. Ex. 2 | P5 | 12 | Δ | 100≦ | X | 0.9 | Δ | 96 | ○ |
| Comp. Ex. 3 | P6 | 21 | ○ | 100≦ | X | 1.2 | ○ | 108 | ○ |
| Comp. Ex. 4 | P7 | 0 | X | −31 | ◎ | 0.6 | Δ | 116 | ○ |

TABLE 8

|  | Polymer particle | Chipping resistance (kg) |  | Storage stability (−Rate of thickening %) |  | Adhesive strength (MPa) |  | Anti-sagging property (Viscosity (Pa·s)) |  |
|---|---|---|---|---|---|---|---|---|---|
| Ex. 5 | P8 | 27 | ◎ | −33 | ◎ | 0.5 | Δ | 111 | ○ |
| Ex. 6 | P9 | 29 | ◎ | −28 | ◎ | 0.8 | Δ | 103 | ○ |
| Ex. 7 | P10 | 35 | ◎ | −30 | ◎ | 1.1 | ○ | 109 | ○ |
| Ex. 8 | P11 | 18 | ○ | −37 | ◎ | 1.3 | ○ | 113 | ○ |
| Comp. Ex. 5 | P12 | 23 | ○ | 100≦ | X | 0.5 | Δ | 108 | ○ |
| Comp. Ex. 6 | P13 | 5 | X | −31 | ◎ | 0.6 | Δ | 106 | ○ |

From these results, in Example 1, a monomer mixture (B), namely (M4), which was to form a polymer (b) having a solubility parameter of 20.32 $(J/cm^3)^{1/2}$, and a monomer mixture (B), namely (M5), which was to form a polymer (b) having a solubility parameter of 20.38 $(J/cm^3)^{1/2}$, were polymerized after a monomer mixture (A), namely (M2), which was to form a polymer (a) having a Tg of 106° C. and a solubility parameter of 19.51 $(J/cm^3)^{1/2}$, was polymerized, and chipping resistance and storage stability of the plastisol composition thus obtained were both at a practical use level.

In Example 2, a solubility parameter of a polymer (a) constituted of a monomer mixture (A), namely (M2), was lowered by raising of the copolymerization amount of tBMA, and storage stability was maintained at the same level as in the case of Example 1 while flexibility was further improved.

In Example 3, the content of a monomer mixture (A), namely (M2), was raised, and chipping resistance of the plastisol composition thus obtained was particularly excellent. Also, storage stability was at a practical use level.

Example 4 was an example of an acrylic sol composition in which 89% by mass of a plasticizer having a solubility parameter of 18.53 $(J/cm^3)^{1/2}$ and 11% by mass of a plasticizer having a solubility parameter of 20.07 $(J/cm^3)^{1/2}$ were used, and chipping resistance thereof was particularly excellent. Also, storage stability thereof was at a practical use level.

Example 9 was an example of an acrylic sol composition in which 94.5% by mass of a plasticizer having a solubility parameter of 18.53 $(J/cm^3)^{1/2}$ and 5.5% by mass of a plasticizer having a solubility parameter of 20.07 $(J/cm^3)^{1/2}$ were used, and chipping resistance and storage stability thereof were particularly excellent.

On the other hand, in Comparative Examples 1 and 6, each monomer mixture was used instead of the monomer mixture (A), from which a polymer having a Tg of 90° C. or less and a Sp value of greater than 19.90 $(J/cm^3)^{1/2}$ was made, and chipping resistance of the plastisol composition thus obtained was poor, though storage stability was good.

In Comparative Examples 2 and 5, each monomer mixture was used instead of the monomer mixture (A), from which a polymer having a Sp value of 19.90 $(J/cm^3)^{1/2}$ or less and a Tg of less than 90° C. was made, and storage stability of the plastisol composition thus obtained was poor, though chipping resistance was good. Gelation of the plastisol composition occurred on the next day.

In Comparative Example 3, though the monomer mixture (A) was used, a monomer mixture, from which a polymer having a Sp value of less than 20.22 $(J/cm^3)^{1/2}$ is obtained, was used instead of the monomer mixture (B), and storage stability of the plastisol composition thus obtained was poor, though chipping resistance was good.

In Comparative Example 4, a monomer mixture, from which a polymer having a Tg of 90° C. or more and a Sp value of greater than 19.90 $(J/cm^3)^{1/2}$ is obtained, was used instead of the monomer mixture (A), and chipping resistance of the plastisol composition thus obtained was poor, though storage stability was good. Also, bleeding of the plasticizer from the coating film was observed.

Examples 5 to 8 and Comparative Examples 5 and 6 indicated evaluation results of the plastisol compositions in which adhesives were compounded. In Example 5, a monomer mixture (B), namely (M4), which was to form a polymer (b) having a solubility parameter of 20.53 $(J/cm^3)^{1/2}$, was polymerized after a monomer mixture (A), namely (M2), which was to form a polymer (a) having a Tg of 106° C. and a solubility parameter of 19.51 $(J/cm^3)^{1/2}$, was polymerized, and chipping resistance and storage stability were good.

In Example 6, a monomer mixture (M3) was used, in which a functional group which reacts with adhesives was introduced, and chipping resistance and storage stability of the plastisol composition thus obtained were good, and adhesive strength was likely to become excellent.

In Examples 7 and 8, each monomer mixture (A) was used, in which a functional group which reacts with adhesives was introduced, and chipping resistance and storage stability of the plastisol composition thus obtained were both at a practical use level, and adhesive strength was particularly excellent.

On the other hand, in Comparative Example 5, polymerization was carried out without use of the monomer mixture (A), and storage stability of the plastisol composition thus obtained was poor, though chipping resistance was good. Gelation of the plastisol composition occurred on the next day. In Comparative Example 6, polymerization was carried out without use of the monomer mixture (A), either, and chipping resistance of the plastisol composition was poor, though storage stability was good.

INDUSTRIAL APPLICABILITY

The plastisol composition of the present invention is excellent in storage stability, particularly under circumstance at 40° C. or above, can give a shaped article excellent in flexibility and chipping resistance, and hence is suitable for shaped articles such as wall papers, steel sheets coated with a vinyl resin, leather, dolls, toys, gloves, floor materials, sponge products, automobile parts, and industrial machinery parts, and in particular, coating materials such as automotive undercoat materials and body sealers, and thus is industrially extremely useful.

What is claimed is:

1. A method for producing a (meth)acrylic polymer particle, comprising polymerizing a monomer or monomer mixture (B) to form a polymer (b) in the presence of a polymer (a) obtained by a process comprising polymerizing a monomer or monomer mixture (A), wherein a glass transition temperature (Tg) of the polymer (a) as calculated from the FOX equation is 90° C. or above, a solubility parameter of the polymer (a) is 19.90 $(J/cm^3)^{1/2}$ or below, and a solubility parameter of the polymer (b) is 20.22 $(J/cm^3)^{1/2}$ or above, and the monomer or monomer mixture (A) comprises 10% by mass or more of t-butyl methacrylate.

2. A method for producing a (meth)acrylic polymer particle, comprising polymerizing a monomer or monomer mixture (B) to form a polymer (b) in the presence of a polymer (a) obtained by a process comprising polymerizing a monomer or monomer mixture (A), wherein a glass transition temperature (Tg) of the polymer (a) as calculated from the FOX equation is 90° C. or above, a solubility parameter of the polymer (a) is 19.90 $(J/cm^3)^{1/2}$ or below, and a solubility parameter of the polymer (b) is 20.22 $(J/cm^3)^{1/2}$ or above, and the monomer or monomer mixture (A) comprises 0.01% by mass or more and less than 10% by mass of a monomer comprising a hydroxyl group or an acetoacetyl group.

3. A (meth)acrylic polymer particle obtained by the method of claim 1.

4. A plastisol composition comprising the (meth)acrylic polymer particle according to claim 3 and a plasticizer, wherein the plasticizer comprises 60% by mass or more of a plasticizer having a solubility parameter in a range of from 18.40 $(J/cm^3)^{1/2}$ or above to lower than 18.71 $(J/cm^3)^{1/2}$.

5. A plastisol composition comprising the (meth)acrylic polymer particle according to claim 3 and a plasticizer, wherein the plasticizer comprises 1% by mass or more and less than 40% by mass of a plasticizer having a solubility parameter in a range of from 18.71 $(J/cm^3)^{1/2}$ or above to lower than 20.45 $(J/cm^3)^{1/2}$.

6. An article comprising the plastisol composition according to claim 4.

7. An undercoating material for an automobile comprising the plastisol composition according to claim 4.

8. A body sealer comprising the plastisol composition according to claim 4.

9. An article comprising the plastisol composition according to claim 5.

10. An undercoating material for an automobile comprising the plastisol composition according to claim 5.

11. A body sealer comprising the plastisol composition according to claim 5.

12. The method for producing a (meth)acrylic polymer particle according to claim 1, wherein the mass ratio of polymer (a) to polymer (b) is from 65/35 to 95/5.

13. A method for producing a (meth)acrylic polymer particle, comprising polymerizing a monomer or monomer mixture (B) to form a polymer (b) in the presence of a polymer (a) obtained by a process comprising polymerizing a monomer or monomer mixture (A), wherein a glass transition temperature (Tg) of the polymer (a) as calculated from the FOX equation is 90° C. or above, a solubility parameter of the polymer (a) is 19.90 $(J/cm^3)^{1/2}$ or below, and a solubility parameter of the polymer (b) is 20.22 $(J/cm^3)^{1/2}$ or above, and the (meth)acrylic polymer particle has a mass average molecular weight of from 10,000 to 5,000,000.

14. The method for producing a (meth)acrylic polymer particle according to claim 1, wherein the particle diameter of the (meth)acrylic polymer particle is from 0.1 μm to 2.0 μm.

15. The method for producing a (meth)acrylic polymer particle according to claim 1, wherein the monomer mixture (A) is polymerized by emulsion polymerization, seed polymerization, soap-free polymerization, dispersion polymerization, or micro suspension polymerization.

16. The method for producing a (meth)acrylic polymer particle according to claim 1, wherein two or more monomer mixtures (B) are polymerized in the presence of polymer (a) after the polymerization of monomer mixture (A).

17. The plastisol composition according to claim 4, wherein the content of the (meth)acrylic polymer particle in the plastisol composition is from 5% to 70% by mass.

18. The plastisol composition according to claim 4, wherein the plastisol further comprises at least one additive selected from the group consisting of a pigment, an antifoamer, a mildewproofing agent, a deodorant, an antimicrobial, a surfactant, a lubricant, an ultraviolet absorbent, a spice, a foaming agent, a leveling agent, an adhesive, a viscosity reducing agent, and a diluent.

19. The plastisol composition according to claim 4, wherein the plastisol further comprises calcium carbonate.

* * * * *